United States Patent
Bommareddy et al.

(10) Patent No.: US 8,024,930 B2
(45) Date of Patent: Sep. 27, 2011

(54) HEAT INTEGRATION IN COAL GASIFICATION AND METHANATION REACTION PROCESS

(75) Inventors: Sampath Kumar Bommareddy, Houston, TX (US); Karthik Subramanyan, Houston, TX (US); James Michael Storey, Houston, TX (US); Jerrold Samuel Kassman, Katy, TX (US); Kurt Richard Imai, Houston, TX (US)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 12/349,127

(22) Filed: Jan. 6, 2009

(65) Prior Publication Data
US 2010/0170247 A1    Jul. 8, 2010

(51) Int. Cl.
*F01K 7/34* (2006.01)
(52) U.S. Cl. .......................................... 60/653; 60/679

(58) Field of Classification Search ................ 60/653, 60/677–680
See application file for complete search history.

(56) References Cited

U.S. PATENT DOCUMENTS

| | | | | | |
|---|---|---|---|---|---|
| 3,898,057 | A | * | 8/1975 | Moller et al. | 48/197 R |
| 4,710,483 | A | * | 12/1987 | Burk et al. | 502/185 |
| 4,999,993 | A | * | 3/1991 | Rao | 60/780 |
| 5,255,504 | A | * | 10/1993 | Hodrien et al. | 60/781 |

* cited by examiner

*Primary Examiner* — Hoang M Nguyen
(74) *Attorney, Agent, or Firm* — Cantor Colburn LLP

(57) ABSTRACT

A combined Gasification, methanation and power island steam turbine system. The system includes a gasification portion, the methanation portion and a steam turbine portion. The Gasification portion includes the new heat recovery design and associated controls for obtaining a desired steam to dry gas ration of 1.1-2.2. The methanation portion includes first, second and third methanation reactors and associated heat recovery integrated with a high-pressure, low-pressure superheater, and HP economizers. The power Island steam turbine includes a High pressure, Intermediate pressure, low-pressure steam turbine having an input coupled to an output of the superheaters in Methanation process.

12 Claims, 2 Drawing Sheets

HEAT INTEGRATION IN COAL GASIFICATION AND METHANATION REACTION PROCESS

BACKGROUND OF THE INVENTION

The subject matter disclosed herein relates to methanation and, in particular, to heat recovery in a methanation reaction process, integrated with coal gasification process.

Methanation is a physical-chemical process to generate methane from a mixture of various gases out of biomass fermentation or thermo-chemical gasification. The main components are carbon monoxide and hydrogen. Methanation processes require clean synthesis gas (syngas) to be fed to the reactor with a $H_2$ to CO ratio of 3:1. The syngas is typically produced in a gasifier. In the case that syngas is the feed product, methanation may produce synthetic natural gas (SNG).

At present, most methanation processes are isolated processes that include a gasification portion and methanation portion. Typical gasification processes with partial heat recovery produce a syngas with $H_2$ to CO ratio of about 0.95 to 1.0. A catalytic shift reactor is added downstream of the gasifier for shifting CO to $H_2$ ratio. The shifting requires moisturized syngas with a steam-to-dry gas ratio of about 1.1 to 2.2 (varies with type of catalyst efficiency). Traditionally, steam is added to the shift reaction process because the syngas exiting the radiant synthesis gas cooler (RSC) quench doesn't have enough moisture.

BRIEF DESCRIPTION OF THE INVENTION

According to one aspect of the invention, a combined methanation and steam turbine system is provided. The system includes a methanation portion and steam turbine portion. The methanation portion includes a first methanation reactor having an input configured to receive synthesis gas and an output, a second methanation reactor having an input coupled to output of the first methanation reactor and an output, a third methanation reactor having an input coupled to the output of the second methanation reactor and an output and a low-pressure superheater coupled between the second reactor and the third reactor that heats low-pressure steam. The steam turbine portion includes a low-pressure steam turbine having an input coupled to an output of the low-pressure superheater.

According to another aspect of the invention, a power plant is provided. The power plant includes a methanation portion and a steam turbine portion. The methanation portion includes a first methanation reactor having an input configured to receive synthesis gas and an output, a second methanation reactor having an input coupled to output of the first methanation reactor and an output, a third methanation reactor having an input coupled to the output of the second methanation reactor and an output and a low-pressure superheater coupled between the second reactor and the third reactor that heats low-pressure steam. The steam turbine portion includes a low-pressure steam turbine having an input coupled to an output of the low-pressure superheater.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

Figure 1:
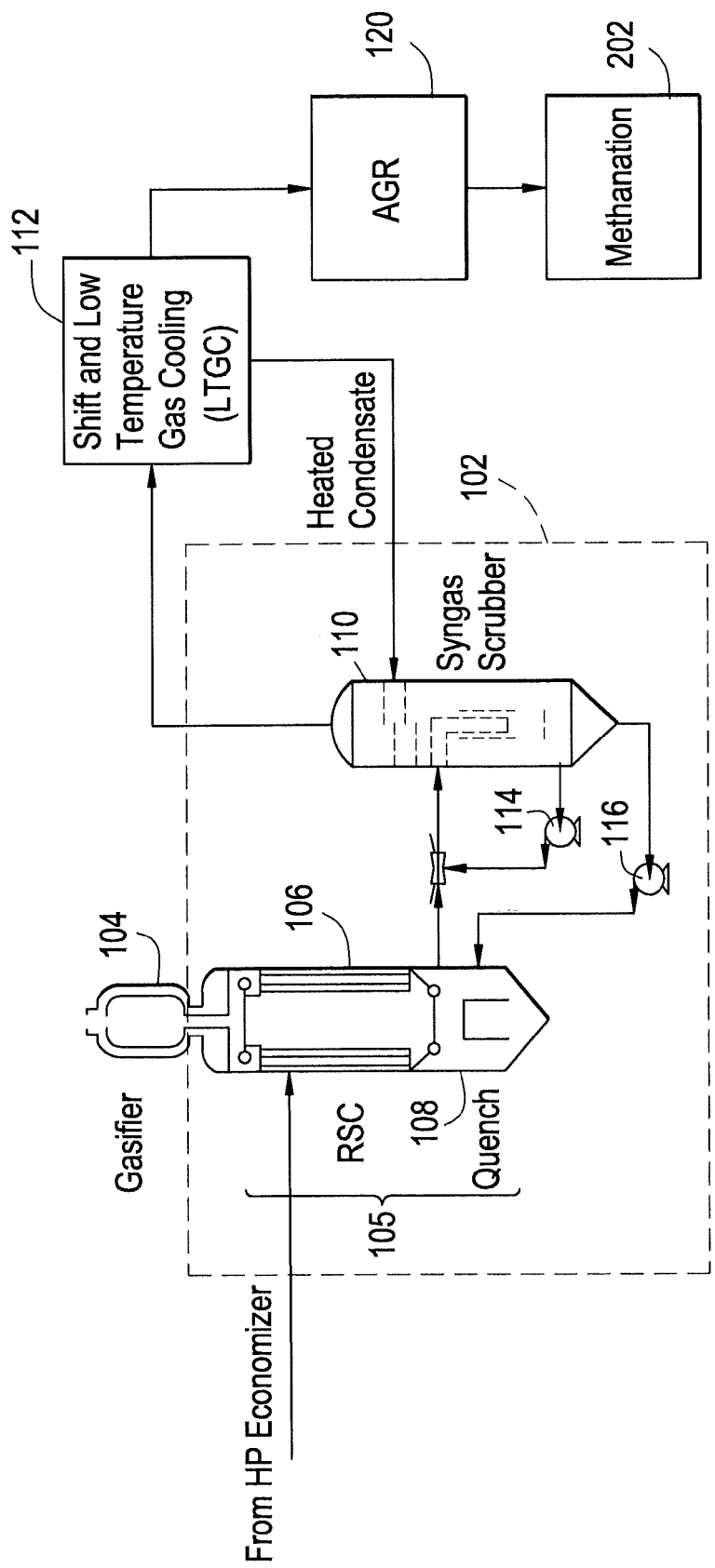
FIG. 1 is schematic drawing of a gasification process according to an embodiment of the present invention.

The detailed description explains embodiments of the invention, together with advantages and features, by way of example with reference to the drawings.

DETAILED DESCRIPTION OF THE INVENTION

Embodiments of the present invention are directed to a radiant synthesis gas cooler (RSC)/SGC (Syngas cooler) for heat recovery from gasifier integrated with quench along with associated controls to obtain the desirable steam to dry gas ratio. Such an embodiment may allow for elimination of additional steam needing to be added to the shift catalyst. Embodiments of the present invention may also introduce a new process scheme for heat recovery integration of gasification with a methanation process having a coupled steam turbine/power Island.

According to the first aspect of the Invention a new optimized design of Gasifier coupled with RSC/SGC (Radiant Syngas cooler/Syngas cooler), downstream coupled with a quench chamber/scrubber with associated controls to give an optimal ration of 1-2.2 ratio of steam to drygas ration for enabling shift using third party catalyst, henceforth reducing the cost/need of traditional steam introduction to shift catalyst.

According to second aspect of the invention optimized gasification process combined with methanation and steam turbine system is provided. The system includes a Gasification portion, methanation portion and steam turbine portion. The methanation portion includes a first methanation reactor having an input configured to receive synthesis gas and an output, the output of the first reactor couple to a HP superheater, a second methanation reactor having an input coupled to output of the HP Superheater and an output, a second methanation reactor coupled to a LP Superheater & HP Economizer#2. The output of HP Economizer#2 is coupled with inlet of the third methanation reactor. The outlet of the third methanation reactor coupled with an HP Economizer#1. The steam turbine portion includes a High/Intermediate and low-pressure steam turbine having an input coupled to an output of the high/low-pressure superheater.

According to another aspect of the invention, an integrated power island with Gasification/Methanation process is provided. The power plant includes an MP Economizer, Deaerator, condenser and a steam turbine with high pressure and low pressure extraction. The net low pressure steam in LTGC (Low Temperature gas cooling) in Gasification Island is superheated in Methanation process, using the available energy at the outlet of the methanation reactor#2. This superheated LP steam is admitted to LP steam turbine in Power Island. The extraction steam from LP Steam Turbine is used for pegging the Deaerator. The high-pressure steam from the syngas cooler in Gasification process is superheated in methanation process is admitted to HP Steam turbine. An extraction steam from HP Steam turbine is used to economize the medium pressure (600-800 psig) boiler feed water required for most of the SRU (Sulfur Recovery unit) process in Gasification Island.

As discussed generally above, the methanation process requires clean syngas to be fed to the methanation portions (which includes one or more methanation reactors) with an $H_2$ to CO ratio of 3:1. Typical gasification with partial heat recovery processes produce a syngas with $H_2$-to-CO ratio of about 0.95 to 1. To raise the $H_2$ to CO ratio, a catalytic shift reactor is added downstream of the gasifier for shifting CO to $H_2$. The shift reactor needs a steam-to-dry gas ratio of about 1.1 to about 2.2 (this value may vary depending on catalyst efficiency) in order to operate properly. In the prior art, this may have required steam be added to the shift reactor because an output of the RSC quenched in a quencher does not have a steam-to-dry gas ratio in the required range. That is, traditionally steam is being added to the shift reaction process because the syngas exiting the quench receiving the output of the RSC doesn't have enough moisture.

Embodiments of the present invention may include a Gasifier with optimized design of RSC/SGC integrated with quench/scrubber downstream and associated controls. In one embodiment, the integrated RSC/quench may be operated in such manner that the output thereof has the desirable steam-to-dry gas ratio. For example, the steam-to-dry gas ratio may be about 1.1 to about 2.2. This may be accomplished, in one embodiment, by increasing the temperature of syngas leaving the RSC/SGC to quench chamber in the quench portion of the integrated RSC quench. The second embodiment is to heat up the recycled condensate to scrubber within LTGC (Low Temperature Gas cooling) section to increase the water content in gas at the outlet of the scrubber. In one embodiment, this may be accomplished by integrating the methanation process and the RSC such that energy recovered in the methanation process (in the form of steam or heated water) is provided to the RSC to increase the steam content of the output thereof. As such, the integrated system may not require the production of additional steam conventionally used to wet the dry gas before introduction into the shift reactor and, thus, reduce non-recovered energy.

FIG. 1 shows an example of an integrated system according to an embodiment of the present invention. In this embodiment, a gasifier 104 produces a raw syngas output. The gasifier 104 is where gasification occurs. Gasification is a process that converts carbonaceous materials, such as coal, petroleum, or biomass, into carbon monoxide and hydrogen by reacting the raw material at high temperatures with a controlled amount of oxygen and/or steam. The resulting gas mixture is called synthesis gas or "syngas" which itself is a fuel. Gasification is a very efficient method for extracting energy from many different types of organic materials, and also has applications as a clean waste disposal technique.

In one embodiment, the gasifier 104 is coupled to a syngas heat recovery and particulate cleaning section 102. The syngas heat recovery and particulate cleaning section 102 may include an integrated RSC/quench 105. The integrated RSC/quench 105 may include two portions, an RSC portion 106 and a quench portion 108. The RSC portion 106 acts as heat exchanger and cools the syngas received from the gasifier 104. This RSC portion 106 is designed and controlled to meet a desired outlet temperature of syngas to quench 108. Further cooling is performed in the quench 108. In one embodiment, the quench 108 may be modified from a conventional quench in such a manner that the syngas exiting the quench have sufficient moisture content to enable the shift. This desired water vaporization to syngas is achieved by controlling the syngas outlet temperature from RSC 105, to quench 108. Regardless, in either embodiment, a beneficial result may include a greater proportion of steam being contained in the syngas as it exits the quench 108.

In one embodiment, the output of the quench 108 is coupled to a syngas scrubber 110 that operates in the conventional manner. The preparation section 102 may also include other optional components such as, for example, a first pump 114 and a second pump 116 that serve to move water between the integrated RSC/quench 105 and the syngas scrubber 110. In one embodiment, the heated condensate in the shift/LTGC 112, is recycled back to the scrubber 110, which will result in a moisturized syngas through the scrubber overhead with the desired steam to drygas ratio. The Economized boiler feedwater to RSC 118 is supplied from the heat integration in Methanation process along with the power island as depicted in FIG. 2.

The output of the syngas scrubber 110 is coupled to a shift reactor 112. The downstream of the shift reactor 112 may, in one embodiment, also include low temperature gas cooling in which the low level energy is recovered (Primarily in terms of heating up the condensate recycle to scrubber and low pressure steam generation). In the prior art, the shift reactor 112 may have required a steam input since the gas exiting the scrubber overhead doesn't meet the steam to drygas ratio required for shifting. According to embodiments of the present invention, because the steam-to-dry gas ratio of the syngas leaving the syngas preparation section 102 has the required ratio. As such, the shift reactor 112 does not include a steam input or does not receive steam even if the input is present. Advantageously, such a shift reactor 112 does not have steam whose energy is not recovered and ultimately lost as in the prior.

The output of shift reactor 112 is coupled to an acid gas remover 120 to remove or reduce sulfur in the syngas. The syngas is then passed to a methanation process 202 described in greater detail below with respect to FIG. 2.

Figure 2:
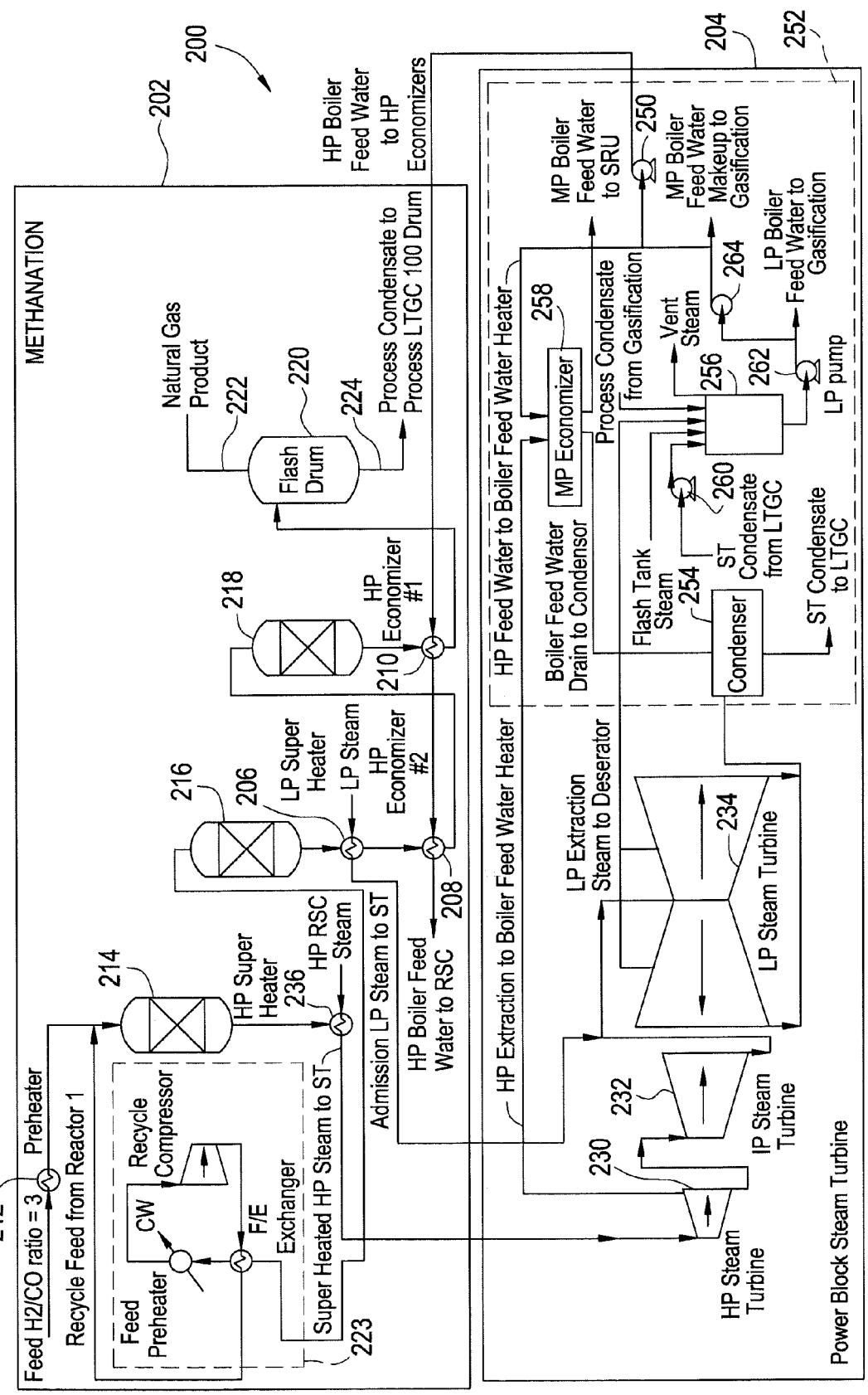
FIG. 2 is a schematic drawing of combined methanation and steam turbine system according to an embodiment of the present invention.

FIG. 2 shows an example of a combined methanation and power Island steam turbine process system 200 (combined system). The combined system 200 includes a methanation portion 202 and a power Island portion 204 that are interconnected. The methanation portion 202 and power island portion are also integrated with gasification portion 102, and shift/low temperature gas cooling portion 112. In the prior art the methanation portion is not interconnected or otherwise coupled to either a gasification portion or a power Island with steam turbine portion. In one embodiment, the methanation portion 202 includes a low-pressure super heater 206, a first high pressure economizer 208, and a second high-pressure economizer 210 that are not included in prior methanation portions. The system 200 may also include a high-pressure superheater 236 that is not included in prior art methanation systems.

The methanation portion 202 receives, at a preheater 212, syngas having an $H_2$ to CO ratio of about 3. The preheater 212 receives the syngas from, for example, an acid gas remover 120 (FIG. 1). The preheater 212 heats the syngas to a standard temperature required for by a first methanation reactor 214. As in conventional methanation processes, the output of the first methanation reactor 214 is passed to a second methanation reactor 216 and the output of the second methanation reactor 216 is passed to a third methanation reactor 218. The output of the third methanation reactor 218 is passed to a flash drum 220 where the natural gas product (methane) created in the methanation process is separated from process condensate. The natural gas product is output via an output indicated by arrow 222. The process condensate, in one embodiment, is output via an output indicated by condensate output arrow 224. In one embodiment, the process condensate is provided to the KO drum of the low temperate gas cooling portion of the shift reactor 112 (FIG. 1).

Embodiments of the present invention are directed to integrating the methanation process with a power Island with steam turbine portion 204 to create a combined process 200. The coupling may allow, in some embodiments, for increased heat recovery as compared to standard methanation processes.

In one embodiment, the steam turbine portion 204 includes a high-pressure steam turbine 230. A steam output of the high-pressure steam turbine 230 is coupled to an input of an intermediate-pressure steam turbine 232. Similarly, a steam output of the intermediate-pressure steam turbine 232 is coupled to an input of a low-pressure steam turbine 234.

In one embodiment, the high-pressure steam turbine 230 receives super heated high-pressure steam from a high-pressure super heater 236 which is coupled to an output of the first methanation reactor 214. Heat from the reaction product from the first methanation reactor 214 is used to super heat high-pressure steam from the combined RSC 105 (FIG. 1) in the high-pressure super heater 236. In one embodiment, a portion of the reaction product from the first methanation reactor 214 is fed back into the first methanation reactor 214 after being processed by a recycle processor 238.

Another portion of the reaction product from the first methanation reactor 214 is fed to an input of the second methanation reactor 216. The output product of the second methanation reactor 216 is fed to an input of the third methanation reactor 218.

In one embodiment, energy from the output product of the second methanation reactor 216 serves to super-heat low pressure steam generated in Shift/LTGC section 112 (FIG. 1) in a low-pressure super heater 206 coupled to the output of the second methanation reactor 216. The low-pressure supper heater 206 super heats low pressure steam and provides the super-heated low-pressure steam to an input to the low-pressure steam turbine 234. The output product of the second methanation reactor 218 also is provided as a heat source to a second high-pressure economizer 208. The second high-pressure economizer 208 heats water for a high-pressure boiler feed of the RSC 118 (FIG. 1). The first high pressure economizer 210 is coupled to the third methanation reactor 218 such that output product from the third methanation reactor 218 heats high pressure boiler feed water received from the power island steam turbine block 204. In particular, water is pumped from the output pump 250 to the first high-pressure economizer 210 where it is heated by output product from the third methanation reactor 218.

As discussed above, one embodiment of the present invention is directed to integrating a methanation process with a power island steam turbine block and also integrating with Gasification process (FIG. 1). In one embodiment, this may be accomplished, for example, by superheating low-pressure steam in a low-pressure super heater 206 and providing the resultant steam to a low-pressure steam turbine 234. The Deaerated water from the deaerator 256 is provided to the first high-pressure economizer 210 where it is heated by the output product of the third methanation reactor 218. The heated water is then provided to the second high-pressure economizer 208 where it is heated by the output product of the second methanation reactor 216. The heated water is provided at high-pressure feed water for the RSC 105 (FIG. 1). The LP Boiler feed water from LP pump 262 is provided to the shift/Low temperature gas cooling section 112 for LP steam production. In the above manner, the, gasification process, methanation process and a steam turbine are integrated with one another. This may, advantageously, provide increased energy recovery from the integrated process Referring again to FIG. 2, the steam turbine 204 may include a post-processing portion 252. The post-processing portion 252 processes water and steam to prepare water for use in other portions of the integrated system. In one embodiment, the post-processing portion 252 includes a condenser 254, a deaerator 256, a medium-pressure economizer 258 and a plurality of pumps. The condenser 254 is coupled to a steam output of the low-pressure steam turbine 234 and the medium-pressure economizer 258. The output of the condenser, in the form of a steam condensate is provided to the shift reactor/Low Temperature gas cooling section 112 (FIG. 1) to recover the low level energy. Steam condensate from this section is pumped by first pump 260 to the deaerator 256. The deaerator 256 may also receive flash tank steam and low-pressure steam extracted from the low-pressure steam turbine 234 as well as process condensate from gasification (shown in FIG. 1). The deaerator 256 creates vent steam and deaerated water that is pumped to a low-pressure boiler for gasification feed water by a second pump 262. The output of the second pump is also pumped to the medium pressure feed water makeup for gasification by a third pump 264 and to the medium pressure economizer 258.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined Gasification, methanation and power island with steam turbine system, the system comprising:
   a methanation portion, the methanation portion including:
      a first methanation reactor having an input configured to receive synthesis gas and an output;
      a second methanation reactor having an input coupled to output of the first methanation reactor and an output;
      a third methanation reactor having an input coupled to the output of the second methanation reactor and an output; and
      a low-pressure superheater coupled between the second reactor and the third reactor that heats low-pressure steam;
   a steam turbine portion, the steam turbine portion including:
      a low-pressure steam turbine having an input coupled to an output of the low-pressure superheater.

2. The system of claim 1, wherein the methanation portion further comprises:
   a flash drum coupled to the output of the third methanation reactor a first high-pressure economizer coupled between the third reactor; and
   a first high pressure economizer coupled between the third methanation reactor and the flash drum.

3. The system of claim 2, wherein the methanation portion further includes:
   a second high-pressure economizer coupled between the second methanation reactor and the third methanation reactor.

4. The system of claim 3, wherein the first high-pressure economizer receives boiler feed water from the steam turbine portion.

5. The system of claim 4, wherein the second high pressure economizer receives an heated water from the first high-pressure economizer and provides heated water to an high-pressure boiler feed a radiant synthesis gas cooler.

6. The system of claim 1, wherein the steam turbine portion further includes:
- a high-pressure steam turbine; and
- wherein the methanation portion further includes:
  - a high-pressure superheater coupled between the first methanation reactor and the second methanation reactor, the high-pressure superheater receiving high pressure steam, superheating the steam and providing it to the high-pressure steam turbine.

7. A power plant comprising:
methanation portion, the methanation portion including:
- a first methanation reactor having an input configured to receive synthesis gas and an output;
- a second methanation reactor having an input coupled to output of the first methanation reactor and an output;
- a third methanation reactor having an input coupled to the output of the second methanation reactor and an output; and
- a low-pressure superheater coupled between the second reactor and the third reactor that heats low-pressure steam;

a steam turbine portion, the steam turbine portion including:
- a low-pressure steam turbine having an input coupled to an output of the low-pressure superheater.

8. The power plant of claim 7, wherein the methanation portion further comprises:
- a flash drum coupled to the output of the third methanation reactor a first high-pressure economizer coupled between the third reactor; and
- a first high pressure economizer coupled between the third methanation reactor and the flash drum.

9. The power plant of claim 8, wherein the methanation portion further includes:
- a second high-pressure economizer coupled between the second methanation reactor and the third methanation reactor.

10. The power plant of claim 9, wherein the first high-pressure economizer receives boiler feed water from the steam turbine portion.

11. The power plant of claim 10, wherein the second high pressure economizer receives an heated water from the first high-pressure economizer and provides heated water to an high-pressure boiler feed a radiant synthesis gas cooler.

12. The power plant of claim 7, wherein the steam turbine portion further includes:
- a high-pressure steam turbine; and
- wherein the methanation portion further includes:
  - a high-pressure superheater coupled between the first methanation reactor and the second methanation reactor, the high-pressure superheater receiving high pressure steam, superheating the steam and providing it to the high-pressure steam turbine.

* * * * *